US008444306B2

(12) United States Patent
Hanson et al.

(10) Patent No.: US 8,444,306 B2
(45) Date of Patent: May 21, 2013

(54) VOCATIONAL TRUCK HEADLIGHT ASSEMBLY

(75) Inventors: Eric J. Hanson, Valparaiso, IN (US); Marcey Collins, Fort Wayne, IN (US); Susan M. LaBounty, Payne, OH (US); Greg C. Miller, Rochester, MI (US); Erik C. Wilson, Decatur, IN (US); George C. A. McCowan, Fort Wayne, IN (US); Joe F. DeNatale, Fort Wayne, IN (US); Kim Hemme, Sterling Heights, MI (US)

(73) Assignee: Caterpillar Inc., Peoria, IL (US)

( * ) Notice: Subject to any disclaimer, the term of this patent is extended or adjusted under 35 U.S.C. 154(b) by 130 days.

(21) Appl. No.: 13/186,745

(22) Filed: Jul. 20, 2011

(65) Prior Publication Data

US 2012/0155100 A1   Jun. 21, 2012

Related U.S. Application Data

(60) Provisional application No. 61/424,833, filed on Dec. 20, 2010.

(51) Int. Cl.
*B60Q 1/26* (2006.01)

(52) U.S. Cl.
USPC ........... 362/507; 362/540; 362/184; 362/543; 362/545; D26/28

(58) Field of Classification Search
USPC ...... 362/507, 540, 543, 545, 184; D26/28–36
See application file for complete search history.

(56) References Cited

U.S. PATENT DOCUMENTS

| 367,027 | A |   | 2/1996 | Onopa |
|---|---|---|---|---|
| D494,900 | S |   | 8/2004 | Satou |
| D499,496 | S |   | 12/2004 | Papke et al. |
| 6,921,187 | B2 |   | 7/2005 | Mochizuki et al. |
| D518,580 | S |   | 4/2006 | Tamiya et al. |
| D560,830 | S |   | 1/2008 | Hsu |
| D563,576 | S |   | 3/2008 | Hanaoka |
| D565,758 | S |   | 4/2008 | Conway et al. |
| D569,020 | S |   | 5/2008 | Schiavone et al. |
| D571,027 | S |   | 6/2008 | Suzuki et al. |
| D588,289 | S | * | 3/2009 | Wagner et al. .................. D26/28 |
| D592,335 | S | * | 5/2009 | Hsu ............................... D26/28 |

(Continued)

FOREIGN PATENT DOCUMENTS

| DE | 40405079-0001 | 3/2010 |
|---|---|---|
| DE | 40405079-0002 | 3/2010 |

(Continued)

*Primary Examiner* — Ali Alavi
(74) *Attorney, Agent, or Firm* — Miller, Matthias & Hull

(57) ABSTRACT

The present disclosure sets forth a composite headlight assembly which increases the visibility and sight afforded to the driver of a vocational truck using such a composite lighting assembly. A composite lighting assembly includes a low beam light and a high beam light, as well as a turn signal and a parking light within one composite housing. As the overall size of the housing is limited by the size of the grill of the vehicle, the present disclosure increases the visibility and sight afforded to the driver by taking advantage of the untapped space within known composite headlight assemblies. More specifically, the turn signal and parking light may include a downwardly depending trapezoidal appendage increasing the overall area of the turn signal and parking light by at least ten percent.

20 Claims, 3 Drawing Sheets

U.S. PATENT DOCUMENTS

| | | | |
|---|---|---|---|
| D593,233 S | 5/2009 | Bai et al. | |
| D638,555 S * | 5/2011 | Schiavone et al. | D26/28 |
| 2004/0257827 A1 * | 12/2004 | Ishida et al. | 362/545 |
| 2004/0264199 A1 * | 12/2004 | Shu et al. | 362/327 |
| 2005/0073849 A1 * | 4/2005 | Rhoads et al. | 362/296 |
| 2005/0190564 A1 * | 9/2005 | Amano et al. | 362/336 |

FOREIGN PATENT DOCUMENTS

| | | |
|---|---|---|
| DE | 40702161-0001 | 3/2010 |
| DE | 40702161-0002 | 3/2010 |
| JP | 2005190990 | 7/2005 |
| JP | 2008077889 | 4/2008 |

* cited by examiner

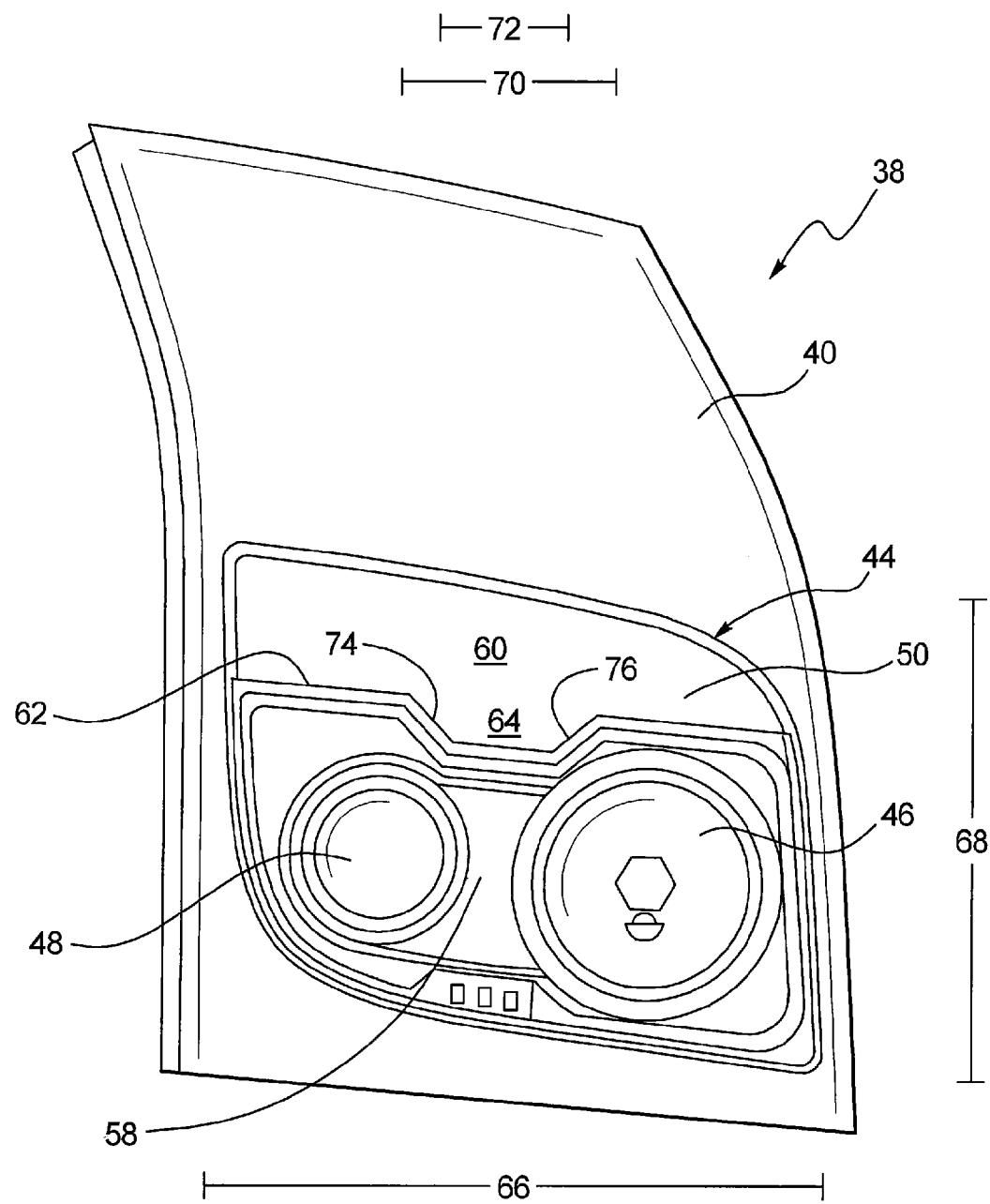

VOCATIONAL TRUCK HEADLIGHT ASSEMBLY

CROSS-REFERENCE TO RELATED APPLICATIONS

This is a non-provisional U.S. patent application, which claims priority under 35 U.S.C. §119(e) to U.S. Provisional Patent Application Ser. No. 61/424,833 filed on Dec. 20, 2010, the entirety of which is incorporated by reference herein.

FIELD OF THE DISCLOSURE

The present disclosure generally relates to vehicular lighting assemblies, and more particularly, relates to vocational truck lighting assemblies including headlights and turn signals.

BACKGROUND OF THE DISCLOSURE

Vocational trucks are well known vehicles used to transport cargo across land and over long distances. Such trucks include dump trucks, tractor-trailers, semis, 18-wheelers or the like, and typically include a "tractor" housing the engine of the vehicle, and the operator cabin. The tractor typically terminates in a fifth wheel or hitch for temporarily attaching a "trailer" which is used to house the cargo being transported, or in the case of dump truck, a hydraulic assembly to raise and lower a dump box or bed at the rear of the vehicle. The vocational trucks are sized as to meet traffic laws associated with standard highway dimensions and in so doing are able to transport cargo practically anywhere a highway is available. This is in contrast to a rail which is only able to transport cargo from fixed locations along its track.

While effective, and indispensable in modern commerce, the fact that the vocational trucks are used on standard highways requires such trucks to provide safety features similar to or exceeding many of those required of typical passenger vehicles such as cars. For example, vocational trucks include headlights, tail lights, turn signals, rearview mirrors, hazard lights, fog lights, and many other features making the vehicle both more visible to oncoming traffic, and increasing the visibility afforded to the driver both in a forward direction, rearward direction and peripherally.

While headlights are certainly one option for increasing the visibility and sight of the vehicle, it is not a straightforward matter of simply making the headlights larger or with a greater lumen output. This is due to a number of factors. One factor limiting the size of the headlights or lighting assemblies are the traffic laws under which the vocational trucks have to operate. For example, for years, vehicles have been required to include "low beam" and "high beam" lights. The low beam lights are used when there is oncoming traffic and essentially reduce and redirect a light output so as not to generate significant glare to the oncoming motorist. When there is no oncoming traffic, the high beams can be used to redirect and/or maximize the lumen output and thus visibility and sight of the driver.

Another factor limiting the size of the overall lighting assembly is the width of a standard lane on a highway. Such lanes are of a fixed width and thus so are the maximum widths available to passenger vehicles and vocational trucks. However, as such vehicles need significant space to accommodate the engine and drive transmissions; a relatively small portion of the vehicle is left available for the provision of the lighting assemblies.

This is particularly true in the case of modern vocational trucks which have an increased need for air intake. The increased need for air intake may be necessitated by such things as improved emissions requirements, aesthetics, or any other motivating factor of the vehicle manufacturer. For example, exhaust gas recirculation and other emissions reduction techniques increase the need for incoming air. Accordingly, if the requirements are increased, so too must the space or area afforded to the grill, louvers or other devices for taking in such air. As this grill area becomes larger, the space available for the lighting assemblies becomes even more limited.

Given these competing interests, the vocational truck industry is left with unsatisfactory solutions at the moment. On the one hand, the visibility and sight of the vehicles should be maximized, but at the same time, such vehicles need to comply with modern federal, state and local traffic laws, while providing the vehicle with sufficient air intake to meet the design criteria of the manufacturer.

SUMMARY OF THE DISCLOSURE

In accordance with one aspect of the disclosure, a headlight assembly is disclosed, which may comprise a first light source, a second light source, and a third light source. The first and second light sources may be horizontally spaced apart and separated by a central median. The third light source may be positioned above the first light source and second light source with the third light source extending horizontally over both the first and second light sources and including a downwardly depending appendage positioned partially within the central median.

In accordance with another aspect of the disclosure, a method of generating additional light from a vocational truck headlight assembly without increasing an overall area occupied by the vocational truck lighting assembly is disclosed, which may comprise providing a first light source, providing a second light source, positioning a third light source so as to extend substantially horizontally above and across the first and second light sources, and positioning a portion of the third light source so as to downwardly depend between the first and second light sources into a central median provided between the first and second light sources.

In accordance with yet another aspect of the disclosure, a vocational truck headlight assembly is disclosed which may comprise a composite housing, a high beam light source in the composite housing, a low beam light source in the composite housing and a parking and turn signal light source in the composite housing. The high and low beam light sources may be laterally spaced by a central median, and the parking and turn signal light source may be partly between the high and low beam light sources in the central median, and partly above the high and low beam sources.

These and other aspects and features of the disclosure will be better understood upon reading the following detailed description when considered in conjunction with the accompanying drawings.

BRIEF DESCRIPTION OF THE DRAWINGS

FIG. 3 is a front view of a headlight assembly constructed in accordance with the teachings of the disclosure;

Figure 1:
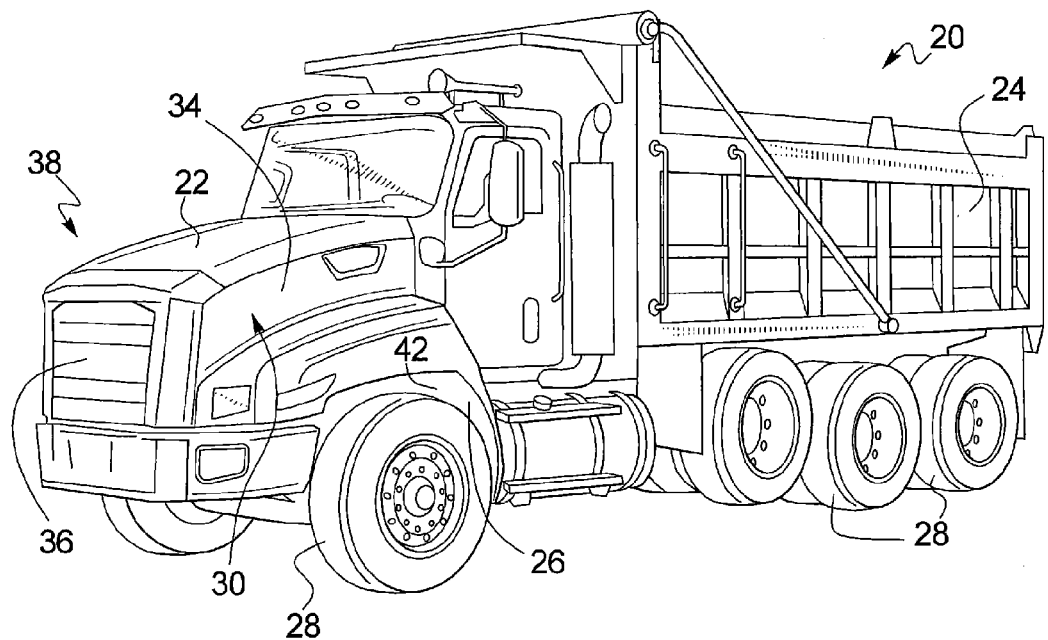
FIG. 1 is a perspective view of a vocational truck constructed in accordance with the teachings of the disclosure.

While the present disclosure is susceptible to various modifications and alternative constructions, certain illustrative embodiments thereof have been shown in the drawings and will be described below in detail. It should be understood, that there is no intention to limit the present invention to the specific forms disclosed but on the contrary, the intention is to cover all modifications, alternative construction, and equivalents falling with the spirit and scope of the present disclosure.

DETAILED DESCRIPTION OF THE DISCLOSURE

Referring now to the drawings, and with specific reference to FIG. 1, a vocational truck constructed in accordance with the teachings of the disclosure is generally referred to by reference numeral 20. As shown therein, the truck 20 may include a tractor 22 forward of a dump box or bed 24. As is conventional, the tractor 22 may include a chassis or frame 26 supported by a plurality of wheels 28. The chassis 26 may in turn support an engine 30 and an operator cabin 32. While not depicted, it is to be understood that the operator cabin 32 would include all of the controls and instrumentation needed for a driver (not shown) to navigate the tractor 22 to a desired destination.

Figure 2:
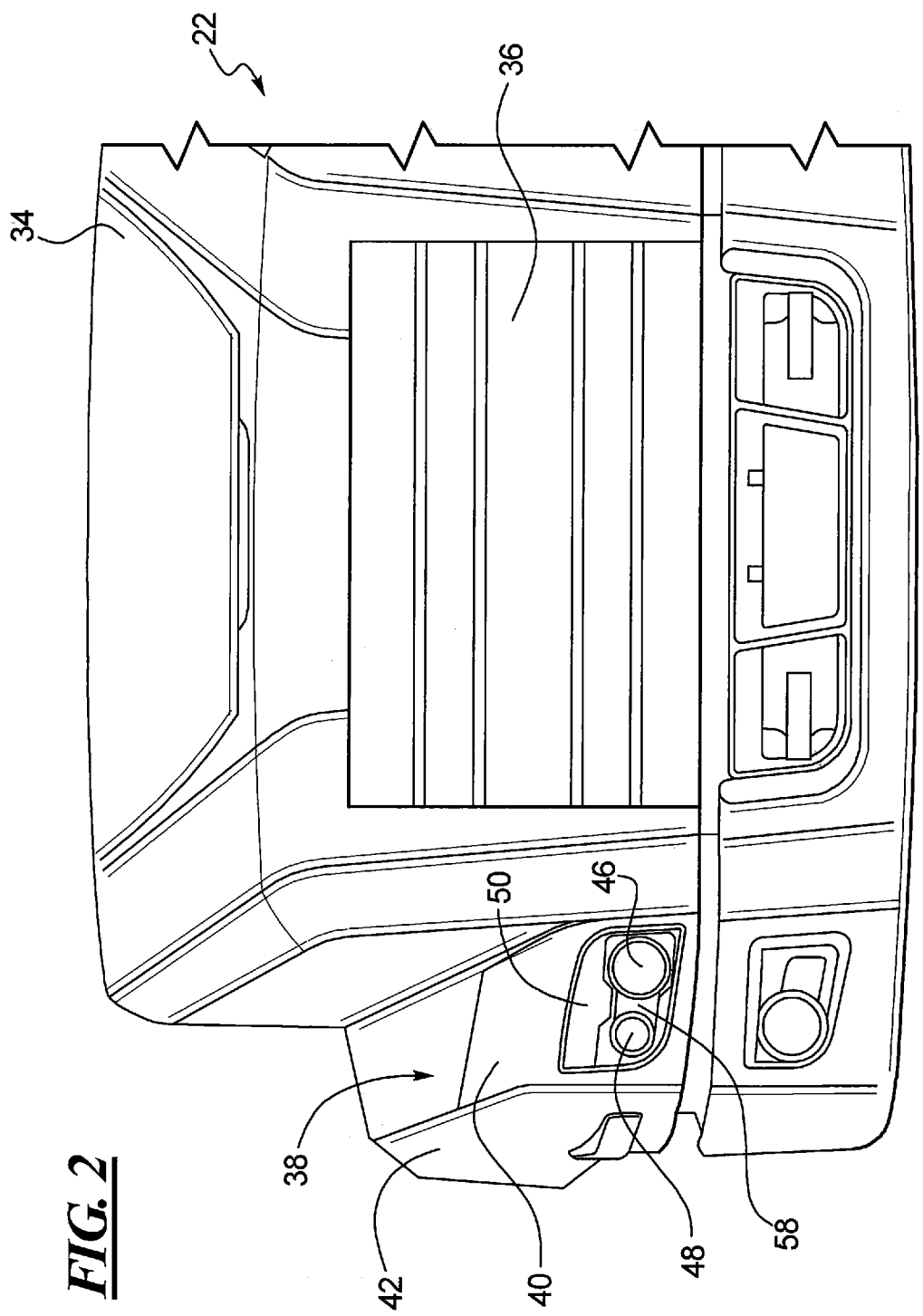
FIG. 2 is a front view of a portion of the vocational truck of FIG. 1.

Referring now to FIG. 2, the tractor 22 is shown in front view to include a hood 34 surrounding the top of the engine 30, and a grill 36 closing off the front of the hood to protect the engine 30 from oncoming debris. Laterally flanking the grill 36 are a pair of headlight assemblies 38. As can be readily appreciated from FIG. 2, the size of the grill 36 is relatively large compared to the space allocated to the headlight assembly 38, thus necessitating the unique design provided by the present disclosure.

Turning now to FIG. 3, the headlight assembly 38 is shown in further detail to include a shroud 40 shaped to circumnavigate a wheel well 42 and in which is provided a composite lighting assembly 44. The composite headlight assembly 44 includes a housing 45 enclosing each of a high beam light source 46, a low beam light source 48, and a parking/turn signal light source 50. The high beam light source 46 may include a reflector 51, while the low beam light source 46 may include a reflector 52 and a projector 53 as shown in FIG. 5.

Figure 4:
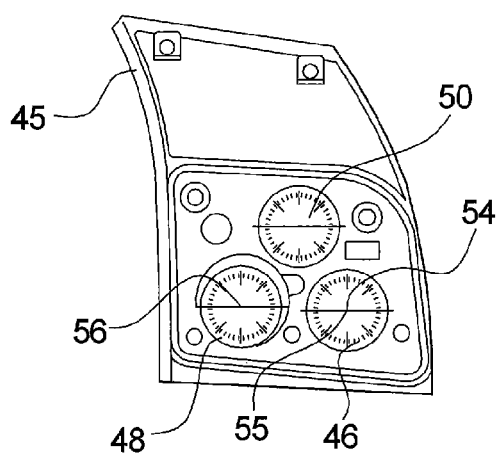
FIG. 4 is a rear view of the headlight assembly of FIG. 3.
Figure 5:
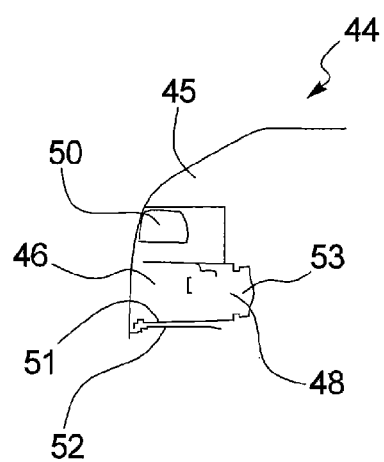
FIG. 5 is a sectional view of the headlight assembly of FIG. 3 taken along line 3-3 of FIG. 3.

Turning now to FIGS. 4 and 5 in combination with FIG. 3, it can be seen that the high beam light 46, low beam light 48 and the turn signal light 50 are purposely positioned so as to take advantage of the relatively small footprint afforded by the oversized grill 36 while at the same time augmenting the visibility of the vehicle and the sight afforded to the driver. The present disclosure is able to do so by, among other things, laterally disposing the high beam light 46 relative to the low beam light 48 along a horizontal axis 54. More specifically, the high beam light 46 and low beam light 48 may each be circular in shape having center points 55 and 56 positioned along the horizontal axis 54. Importantly, the high beam light 46 and low beam light 48 are divided by a central median 58.

Turning back to FIG. 3, it will be noted that the turn signal light 50 includes an elongated expanse 60 having a bottom edge 62 from which downwardly depends a trapezoidal appendage 64. The unique shape afforded by the turn signal light 50 maximizes the visibility of the overall headlight assembly 38, as well as increases the sight afforded to the driver of the vehicle. Given the relatively small footprint that the headlight assembly 38 is allowed, the use of such a trapezoidal appendage 64 takes advantage of the limited space available and meets the increased visibility and sight requirements the industry demands.

In fact, turning to the dimensions of the specific embodiment set forth in FIG. 3, the composite headlight assembly 44 in such an embodiment may include an overall width 66 of 251 millimeters and an overall height 68 of 112 millimeters. Moreover, the high beam light 46 and the low beam light 48 are spaced apart by 126 millimeters with the central median 58 occupying 32 of those millimeters. Given such overall dimensions, the trapezoidal appendage 64 provides a head width 70 of 90 millimeters, and a tail width 72 of 45 millimeters. First and second side edges 74 and 76 taper from the head width 70 to the tail width 72 at approximately 45° angles. In so doing, the trapezoidal appendage 64 increases the overall area occupied by the turn signal light 50 by approximately 13 percent in such an embodiment.

More specifically, in the embodiment depicted, the trapezoidal appendage 64 has an area of 1,224 sq. millimeters, whereas the overall area occupied by the turn signal light 50 is 9,938 millimeters. Using the area of the trapezoidal appendage as the numerator and the area of the overall turn signal as the denominator, this equates to a 13 percent increase. Of course, other embodiments having different dimensions are certainly possible. However, the inventors have found that an increase of at least 10 percent in the size of the turn signal will significantly and noticeably increase the visibility and sight afforded to the driver and thus is encompassed within the teachings of the present disclosure as well.

Based on the foregoing, the inventors have devised a parameter, known herein as a Composite Light Index (CPI) to quantify the effect of the increased size of the turn signal light. Without increasing the overall area of the composite light assembly, the composite light assembly is defined herein as having a CPI of at least one if the turn signal light output area is increased by ten percent. Accordingly, in the embodiment disclosed above, the composite light assembly, which produces an increase in light output are of thirteen percent, has a CPI of 1.3. Other ranges and CPI values are certainly possible and encompassed within the spirit and scope of the present disclosure, but the inventors have found that a CPI of at least 1 will have a noticeable effect on the visibility and sight afforded to the driver.

INDUSTRIAL APPLICABILITY

In general, it can be seen that the present disclosure sets forth a composite headlight assembly which increases the visibility and sight afforded to the driver of a vocational truck using such a composite lighting assembly. The composite lighting assembly may include a low beam light and a high beam light, as well as a turn signal and parking light within one composite housing. However, as the overall size of the housing is limited by the size of the grill of the vehicle, the present disclosure increases the visibility and sight afforded to the driver by taking advantage of the heretofore untapped space within known composite headlight assemblies. More specifically, the turn signal and parking light may include a downwardly depending trapezoidal appendage increasing the overall area of the turn signal and parking light by at least ten percent.

What is claimed is:
1. A headlight assembly, comprising:
a first light source;

a second light source, the first and second light sources being horizontally spaced apart and separated by a central median; and a third light source positioned above the first light source and second light source, the third light source extending horizontally over both the first and second light sources and including a downwardly depending appendage positioned partially within the central median.

2. The headlight assembly of claim 1, wherein the first, second and third light sources are all positioned within a single composite housing.

3. The headlight assembly of claim 1, wherein the first light source is a high beam light source.

4. The headlight assembly of claim 3, wherein the high beam light source includes a reflector.

5. The headlight assembly of claim 1, wherein the second light source is a low beam light source.

6. The headlight assembly of claim 5, wherein the low beam light source includes a reflector and a projector.

7. The headlight assembly of claim 1, wherein the third light source is a parking and turn signal light.

8. The headlight assembly of claim 1, wherein the downwardly depending appendage of the third light source represents at least a ten percent increase in light output area.

9. The headlight assembly of claim 8, wherein the downwardly depending appendage of the third light source represents at least a thirteen percent increase in light output area.

10. A method of generating additional light from a headlight assembly without increasing an overall area occupied by the headlight assembly, comprising;

providing a first light source;

providing a second light source, the first and second light sources being horizontally spread apart and separated by a central median;

positioning a third light source so as to extend substantially horizontally above and across the first and second light sources; and positioning a portion of the third light source so as to downwardly depend between the first and second light sources.

11. The method of claim 10, wherein the providing and positioning involve providing a single composite housing for the first, second and third light sources.

12. The method of claim 10, wherein providing the first light source involves providing a high beam light source.

13. The method of claim 10, wherein providing the second light source involves providing a low beam light source.

14. The method of claim 10, wherein providing the third light source involves providing a parking and turn signal light.

15. The method of claim 10, wherein positioning the portion of the third light source involves adding at least ten percent more light output area to the third light source without increasing the overall area occupied by the vocational truck headlight assembly.

16. The method of claim 15, wherein positioning the portion of the third light source involves adding at least thirteen percent more light output area to the third light source without increasing the overall area occupied by the vocational truck headlight assembly.

17. The method of claim 12, wherein the high beam light source includes a reflector.

18. The method of claim 13, wherein the low beam source includes a reflector and a projector.

19. A vocational truck headlight assembly, comprising:

a composite housing;

a high beam light source in the composite housing;

a low beam light source in the composite housing, the high and low beam light sources being laterally spaced by a central median; and a parking and turn signal light source in the composite housing, the parking and turning signal light source being partly in the central median between the high and low beam light sources and partly above the high and low beam light sources.

20. The vocational truck headlight assembly of claim 19, wherein the vocational truck headlight assembly has a Composite Light Index of at least one.

* * * * *